US006868108B1

(12) United States Patent
Clark

(10) Patent No.: US 6,868,108 B1
(45) Date of Patent: Mar. 15, 2005

(54) METHOD AND APPARATUS FOR GENERATING AND TRANSMITTING A STATIONARY DITHER CODE

(75) Inventor: James M. Clark, Verona, NJ (US)

(73) Assignee: ITT Manufacturing Enterprises, Inc., Wilmington, DE (US)

( * ) Notice: Subject to any disclaimer, the term of this patent is extended or adjusted under 35 U.S.C. 154(b) by 771 days.

(21) Appl. No.: 09/711,178

(22) Filed: Nov. 13, 2000

Related U.S. Application Data

(60) Provisional application No. 60/164,952, filed on Nov. 12, 1999, and provisional application No. 60/164,946, filed on Nov. 12, 1999.

(51) Int. Cl.$^7$ ................................................. H04B 1/69
(52) U.S. Cl. ........................ 375/130; 375/133; 375/150; 375/148; 370/203; 370/335; 380/44
(58) Field of Search ................................. 375/130, 133, 375/150, 148; 370/203, 335; 380/40

(56) References Cited

U.S. PATENT DOCUMENTS

| | | | | |
|---|---|---|---|---|
| 4,972,431 A | * | 11/1990 | Keegan | 375/150 |
| 5,414,771 A | * | 5/1995 | Fawcett, Jr. | 380/44 |
| 5,432,814 A | * | 7/1995 | Hasegawa | 375/133 |
| 5,691,974 A | * | 11/1997 | Zehavi et al. | 370/203 |
| 5,790,588 A | * | 8/1998 | Fukawa et al. | 375/148 |
| 6,167,037 A | * | 12/2000 | Higuchi et al. | 370/335 |
| 6,574,205 B1 | * | 6/2003 | Sato | 370/335 |

OTHER PUBLICATIONS

L.B. Milstein et al.; Combination Sequences for Spread Spectrum Communications; IEEE Transactions on Communications; Jul. 1977; pp. 691–696.*

Ananda, M.P., et al., Satellite Navigation Systems, Autonomous Navigation of the Global Positioning System Satellites, McGraw–Hill Encyclopedia of Science and Technology, pp. 53–59, 1986.

Ananda, M.P. et al., Autonomous Navigation of the Global Positioning System Satellites. The AIAA Guidance and Control Conference, Aug. 20–22, 1984, pp. 1–11.

Spilker, Jr., J.J. "GPS Signal Structure and Performance Characteristics", pp. 29–54, Global Positioning System, The Institute of Navigation, vol. 1, 1980.

Glazer, B.G., "GPS Receiver Operation", pp. 81–86, Global Positioning System, The Institute of Navigation, vol. 1, 1980.

Winsch, Robert G., Telecommunication Transmission System (Second Edition), Copyright 1998, 1993 by McGraw–Hill, pp. 128–135.

* cited by examiner

Primary Examiner—Stephen Chin
Assistant Examiner—Sudhanshu C. Pathak
(74) Attorney, Agent, or Firm—Edell, Shapiro & Finnan, LLC

(57) ABSTRACT

A generator generates a composite code from dithered copies of a reference code to form an optimal stationary dither code. The generator either dithers the length of the reference code to generate a boundary dither code composed of a series varying length short codes, or it dithers the phase of the reference code to generate rotation dither code composed of a series of fixed length short codes that vary in phase. The generator dithers the reference code according to a dither pattern. The composite code is an optimal dither code, having an optimal autocorrelation properties, by generating a dither pattern in which phase vectors for the constituent code are not repeated within the code.

17 Claims, 13 Drawing Sheets

FIG.4A BOUNDARY DITHER:

FIG.4B ROTATION DITHER:

FIG.4C ALIGNED REFERENCE CODES:

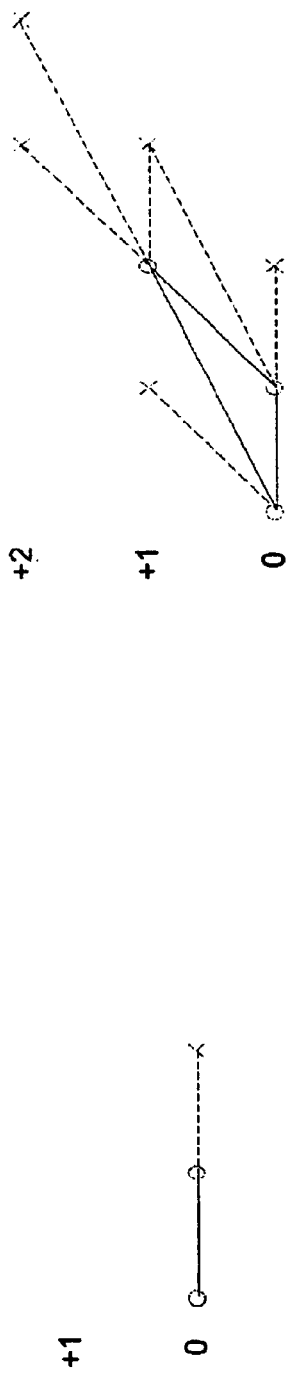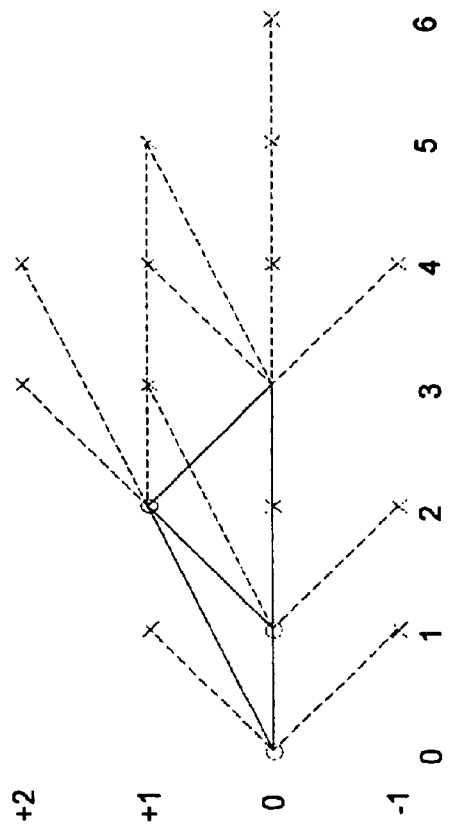
FIG.11A
FIG.11B
FIG.11C

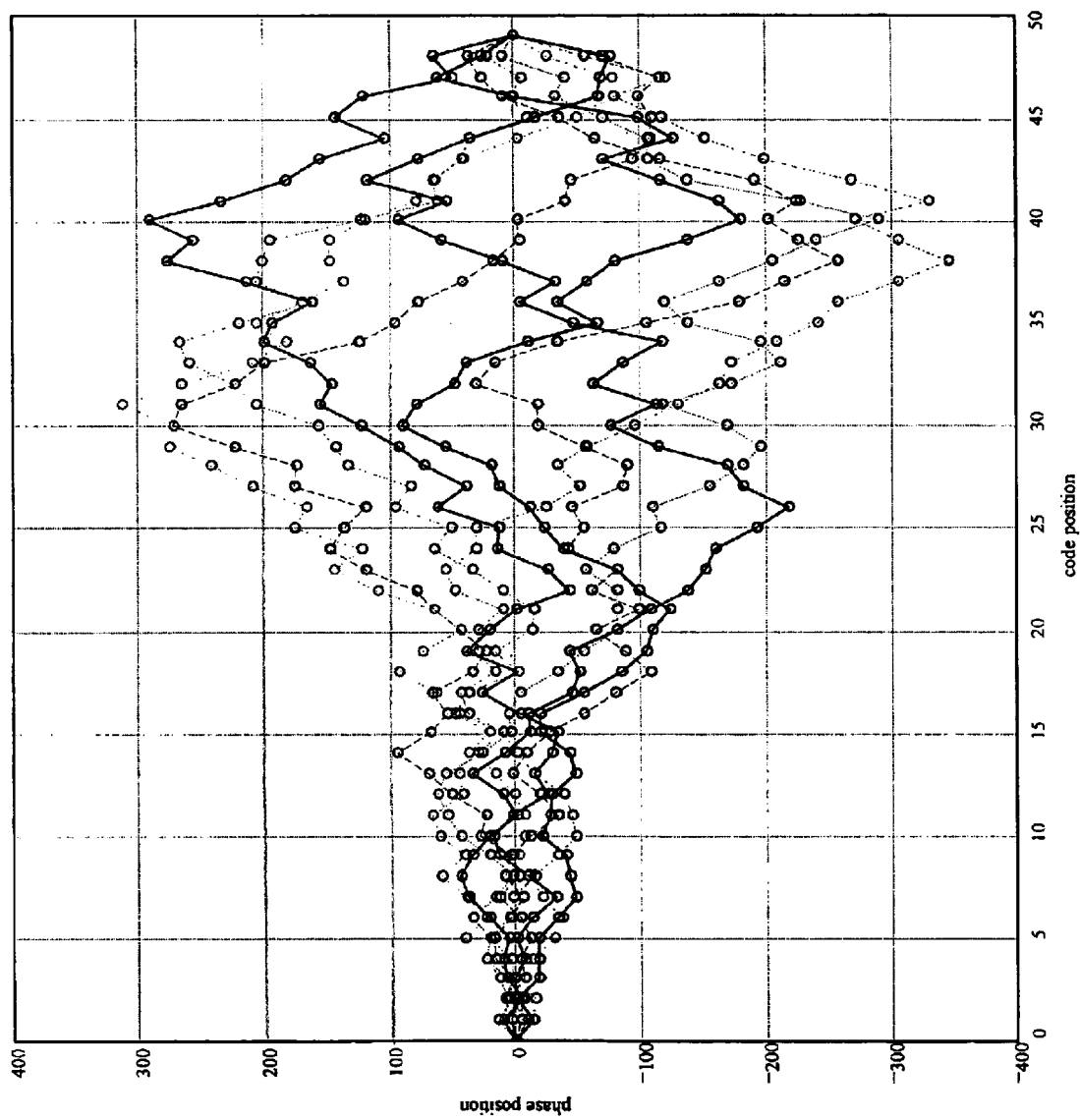

METHOD AND APPARATUS FOR GENERATING AND TRANSMITTING A STATIONARY DITHER CODE

CROSS REFERENCE TO RELATED APPLICATION

This application claims priority from U.S. Provisional Patent Application Ser. Nos. 60/164,952, entitled "Optimal Stationary Dither Code," and 60/164,946, entitled "Stationary Dither Code Detection," both filed Nov. 12, 1999. The disclosures of these provisional patent applications are incorporated herein by reference in their entirety.

BACKGROUND OF THE INVENTION

1. Field of the Invention

The present invention relates to data communication and timing systems and, more particularly, to data communication and timing systems using codes with coding boundaries that vary according to a dithering pattern.

2. Description of the Related Art

Pseudonoise (PN) codes, also known as pseudorandom codes, have good autocorrelation properties and are ideal for measuring the time-of-arrival of a signal, and hence, for use in ranging applications. A high coding gain is achieved when a receiver correlates the code, such as a PN code, for a long time. Accordingly, long PN codes have been used to provide high coding gain.

An example of using a long PN code is in the Global Positioning System (GPS). GPS is a satellite-based navigation system in which each satellite in the GPS constellation transmits a unique precision (P) code. Each P code is a very long PN code that has a period of one week, and hence, repeats only once per week. The P code provides for a high gain correlation signal that allows a receiver to acquire precise timing information, and hence, precise ranging information between the receiver and satellite. To acquire the P code signal a receiver must determine the phase of the received P code. However, because the P code is so long it is difficult for a receiver to determine its phase. If a receiver includes a very accurate clock, such as an atomic clock, it might stay synchronized with the transmitter's clock and could therefore generate a local reference P code that is nearly in-phase with the received P code. But this would require an expensive, complex and unwieldy receiver. Even with a very accurate and stable clock frequency, there is the problem of initially setting the correct time of day. This requires testing all of the code phases that span the range of the time uncertainty. Theoretically a receiver could include enough correlators to test each phase of the P code simultaneously to detect its phase, but in practice that a solution would not be feasible because of the extremely large number of correlators required due to the length of the P code. A receiver also, theoretically, uses a practical number of correlators and test the possible phases of the P code sequentially. However, this would take a long time due to the length of the P code.

The GPS system uses another technique to acquire the P code. It uses a second signal, known as the course acquisition (C/A) signal, to determine initial timing information, then uses that timing information to assist in detecting the phase of the P code. The C/A signal is a much shorter code of 1023 symbols and repeats approximately every millisecond. Accordingly, the CIA code can be detected quickly, either by using a bank of correlators to test each possible phase of the code, or by testing the phases in sequence. However, the C/A code can provide timing only within a one millisecond interval (one interval cannot be distinguished from another), and thus, by itself, cannot resolve all of the time uncertainty (typically a few seconds). But once a GPS receiver acquires the C/A signal, it can determine enough timing information to limit the P code search to specific phases of the P code to speed its acquisition of the P code. However, using one code to help acquire a longer code, such as in the GPS system, requires that the transmitter generate and transmit two signals and that a receiver be able to receive and detect both signals.

Accordingly, there is a need to generate and transmit a long code with good autocorrelation characteristics that can be acquired quickly by using a feasible number of correlators and without requiring another signal that provides timing information.

A conventional spread-spectrum communications system, such as the GPS system, is shown in FIG. 1. The system of FIG. 1 includes a transmitter 1 and a receiver 9. The transmitter includes a PN code generator 2 that is driven by a timing counter 3 and both are run based on a clock oscillator 4. The PN code generated by generator 2 is modulated with a carrier signal via modulator 5 which is driven by carrier oscillator 6. Optionally, data can be superimposed onto the code and carrier by using a modulo 2 adder 7. The transmitter 1 transmits the modulated carrier via antenna 8 to a receiver 9.

Receiver 9 receives the transmitted signal via an antenna 10 that provides the received signal to a demodulator 11. The demodulator 11 is driven by a carrier oscillator 12, and produces two signals out-of-phase by 90°. Those signals are designated as in-phase (I) and quadrature(Q) signals. These two out-of-phase signals are provided to a group of parallel correlators 13. The parallel correlators can include as many, and even more, correlators as the number of phases of the code to be tested. For example, if the code length is 1023 symbols, or chips, the parallel correlators 13 can consist of 1023 correlators, one correlator for each possible phase of the code. Multiple banks of the parallel correlators 13 can be used to correlate different signals, such as in this case where one bank correlates the I-signals and another bank correlates the Q-signals. The parallel correlators 13 are also provided with PN reference codes that correspond to the PN codes generated in the transmitter. PN code generator 14 generates the reference codes. The reference codes can be delayed to correspond to the various phases to be tested. Alternatively, the input signals, here the I and Q signals, can be delayed with various delays and correlated with a single PN code to test the different phases. The PN code generator 14 is driven by a local clock oscillator 15 and timing counters 16 which can effect the different timings for the PN reference codes. The local clock oscillator also drives timing counters 16.

Many different types of PN code generators can be used in spread-spectrum systems such as that shown in FIG. 1. A small scale example of one such conventional PN code generator is shown in detail in FIG. 2. The PN code generator of FIG. 2 includes a shift register 20 and a modulo-2 adder 21. In this example, the shift register is three bits long, although longer lengths are usually used. The three flip-flops of shift register 20 are synchronously driven by a clock signal. Modulo-2 adder 21 adds the first and third bits of the shift register, and inserts the result into the first position of register 20 while all bits are shifted to the right by one position. Starting with any pattern other than all zeros in the register, repeating this operation once for each clock pulse produces an output pattern, shown in FIG. 3B, that repeats every seven bits. In this manner, a maximal-length PN sequence is produced.

A sequence of PN codes is shown in FIGS. 3A and B. The sequence in FIG. 3A shows the symbol positions in a 7-symbol PN code, with the symbol positions labeled 0 through 6. FIG. 3B shows the symbol values, where the symbols are bits, and the code is "0010111." Here, the code repeats regularly without variation in code length or phase, and hence, a receiver cannot discriminate one instance of the code from another.

These conventional transmitters, receivers and code generators suffer from the problems described above and are unable to generate a long code that can be received quickly and inexpensively, without the aid of a second timing signal. Accordingly, there is also a need for a generator and transmitter that can produce a long code with good autocorrelation properties, yet can be acquired quickly and inexpensively without the need for first detecting a second timing signal.

SUMMARY OF THE INVENTION

Therefore, in light of the above, and for other reasons that become apparent when the invention is fully described, an object of the present invention is to generate a long code from a sequence of shorter codes, where the shorter codes are dithered versions of the same short code. When the dither pattern is fixed, generally so that the receiver can know it beforehand, the long code constructed with that dither pattern is referred to here as a stationary dither code.

Another object of the present invention is to generate an optimal stationary dither code.

Yet another object of the present invention is to generate a long code with optimum autocorrelation properties.

A further object of the present invention is to generate a long code with good autocorrelation properties from a short code also with good autocorrelation properties.

Yet a further object of the present invention is to use a single pseudonoise generator to generate a long code with the easier detection characteristics typical of a short code.

A still further object of the present invention is to generate a long code with a predetermined dither pattern.

Yet another object of the present invention is to provide an apparatus that achieves one or more of the above objects.

The aforesaid objects are achieved individually and in combination, and it is not intended that the present invention be construed as requiring two or more of the objects to be combined unless expressly required by the claims attached hereto.

In accordance with one aspect of the present invention there is provided a method of generating a dither code, that includes a) generating a first short code by dithering a reference code according to a dither pattern; b) generating a second short code by dithering the reference code according to the dither pattern, wherein the code phases of the first and second short codes are different from each other; c) repeating a) and b) a predetermined number of times; and d) outputting in sequence the short codes generated in a) through c) as the dither code.

According to another aspect of the invention there is provided a method of constructing (designing) a composite code from M instances of a reference code, where M is an integer. The method is an iterative method; that is, when the composite code is partly constructed, having so far N−1 instances of the reference code, certain operations are performed to add another instance of the reference code to the construction. These operations include:

a) referring to the last, that is, the (N−1)th, code generated from the reference code, the (N−1)th code having an (N−1)th phase position, where N is an integer less than M;

b) selecting the next, that is, the Nth, code generated from the reference code, the Nth code having an Nth phase position, avoiding disallowed code points that were previously determined, and determining the phase difference V between the phase of the (N−1)th code and the phase of the Nth code; and c) adding the phase difference V to the phase of the (N−1)th code and likewise, codes generated prior to the (N−1)th code, to determine disallowed code points.

According to yet another aspect of the invention there is provided an apparatus for generating a composite code, such as one designed by the above method. The apparatus includes a clock oscillator outputting a clock signal; a controller coupled to the clock oscillator, counting in response to the clock signal, and generating a control signal based on the count and indicating a dither amount; and a code generator coupled to the controller and generating a code dithered in response to the control signal, wherein the controller generates the control signal to indicate an amount of dither for the generated code so the phase of the generated code differs as specified, as designed, or as desired from the preceding code generated by the code generator.

According to still another aspect of the invention there is provided a transmission signal, comprising M codes each having a phase dithered with respect to a reference code, wherein the phases of the M codes are dithered according to a dither pattern. The phases of the M codes can be dithered by varying the lengths of the M codes according to the dither pattern, or dithered by rotating the phase of the reference code according to the dither pattern, and such that the transmission signal has an optimal autocorrelation characteristic.

The above and still further objects, features and advantages of the present invention will become apparent upon consideration of the following descriptions and descriptive figures of specific embodiments thereof. While these descriptions go into specific details of the invention, it should be understood that variations may and do exist and would be apparent to those skilled in the art based on the descriptions herein.

BRIEF DESCRIPTION OF THE DRAWINGS

FIG. 4A shows an example boundary dither code.

FIG. 4B shows an example rotation dither code.

FIG. 4C shows alignments of a reference code with the boundary dither and rotation dither codes shown in FIGS. 4A and B that a receiver might use to detect either of the dither codes shown in FIGS. 4A and B.

FIG. 9A shows matching a boundary dithered code and a reference code.

FIG. 9B shows matching a rotation dithered code and a reference code.

FIGS. 11A–C are dither pattern graphs illustrating various stages involved in generating an optimal stationary dither code according to the invention.

FIG. 12B is a dither pattern graph showing ten examples of optimum dither codes, each generated from 50 short pseudonoise codes.

DESCRIPTION OF THE PREFERRED EMBODIMENTS

Figure 1:
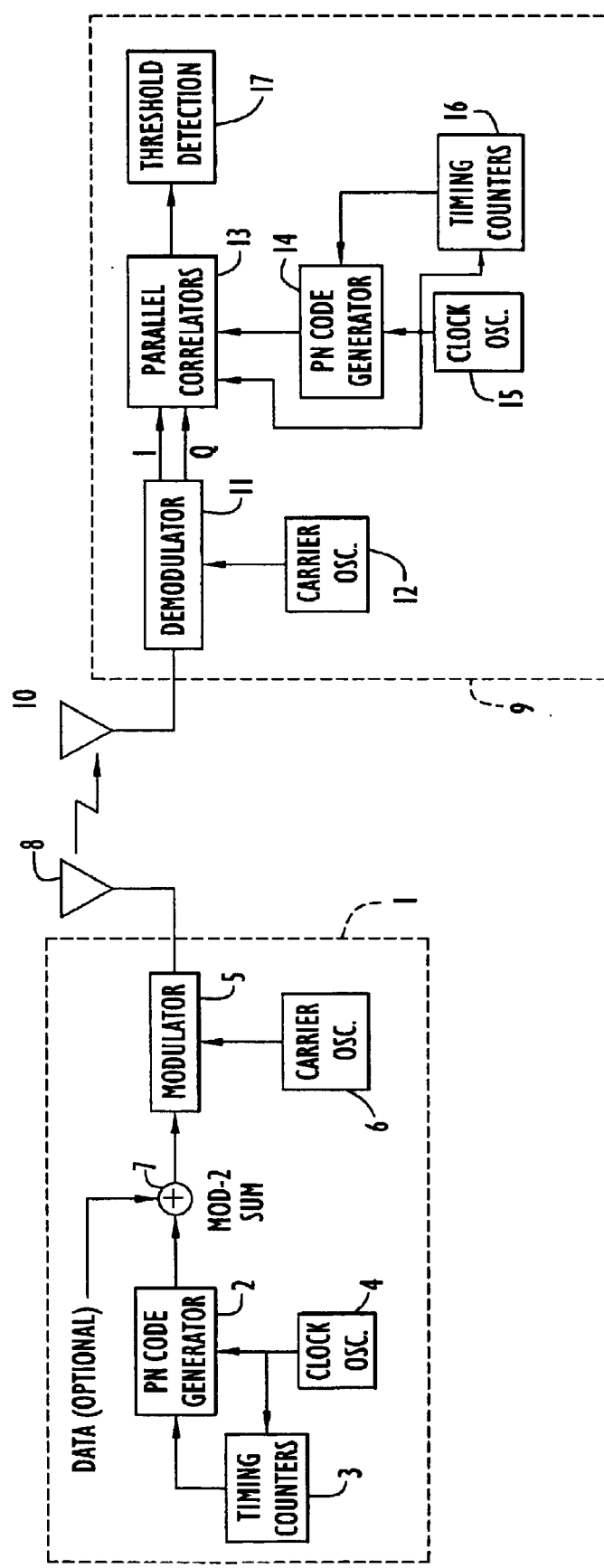
FIG. 1 is a block diagram of a conventional spread-spectrum communication system.

Preferred embodiments according to the present invention are described below with reference to the above drawings, in which like reference numerals designate like components.

Overview

According to the present invention, a long code can be generated by using a reference code with good autocorrelation properties, such that a receiver can detect the long code without having to correlate each phase of the long code concurrently with parallel correlators, or over time over the entire period of the long code. Rather, the code can be quickly detected by using a reasonable number of correlators, similar to the number of correlators that would be used to detect the reference code. The long code is generated by repeating the reference code with a fixed pattern of phase variations called dither. Various types of dither can be used, as described below in detail. Also, certain methods described here generate optimal dither patterns where the autocorrelation of the long code is ideal if the autocorrelation of the short code is ideal.

A co-pending patent application, entitled "Method and Apparatus for Detecting a Stationary Dither Code," relates to detecting stationary dither codes, and is incorporated herein by reference.

Dither Types

Figures 2, 3A, 3B:
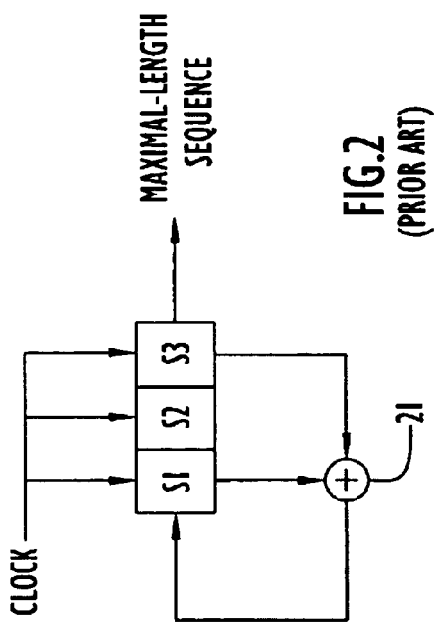
FIG. 2 shows a conventional pseudonoise generator.
FIG. 3A shows bit positions of a seven-bit code.
FIG. 3B shows values of the seven-bit code shown in FIG. 3A.

A dither code can be generated from a predetermined code, by changing certain aspects of that predetermined code. There are many PN codes that can be used, such as m-sequences produced by a generator like that shown in FIG. 2. For example, a reference code N chips, or bits, long with good autocorrelation properties is selected. A code generator generates a long code according to the invention, by repeating the reference code M times. However, so that a receiver can distinguish one part of the long code from another, the generator varies the timing, or dithers, the repetitions of the reference code. The varied timing repetitions of the reference code are referred to here as short codes. The original undithered code is referred to here as the reference code, because a receiver typically will generate the reference code and use it as a reference to detect the dithered short codes.

One kind of dither is a boundary dither that is created by varying the lengths of the short codes by small amounts. All of the short codes start the same way, but a generator adds or deletes bits at the ends of the codes in order to vary the length of the reference code. The boundaries between the short codes are thus not equally-spaced, but are varied by the dither pattern. The length of the long code is nominally M*N chips, but perhaps not exactly, because of the length variations due to the boundary dither.

Another kind of dither is rotation dither, performed by rotating the short codes, yet keeping the code length constant. That is, the short codes start in varying states, or at varying phases of the code, and each rotation dithered short code includes the entire reference code. The boundaries between the rotation dithered short codes are equallyspaced since the code lengths are the same, but there remains one feature in common with the boundary dither. Namely, if a dithered code is compared with an undithered code, the code phase of the short codes will appear to shift back and forth in some pattern referred to here as the dither pattern. The length of the long code is exactly M*N symbols, or chips, in the case of rotation dither.

The dither patterns, also called dither codes, considered here are fixed, and thus they are called stationary dither codes.

FIGS. 4A–C illustrate the two types of dither with a small-scale example, in which the 7-bit code of FIG. 3 is repeated four times. Dithering the 7-bit reference code by the boundary dither method varies the lengths of the codes. The codes marked in FIG. 4A as (−1) are one bit shorter, and those marked (+1) are one bit longer than the reference code.

Dithering the 7-bit reference code by the rotation dither method shifts the codes. The codes marked in FIG. 4B as (−1) are rotated one bit to the left, those marked (+1) are rotated one bit to the right, and those marked (0) are not rotated.

For either type of dither, a receiver can generate a reference code (an unmodified 7-bit code) and find phase shifts of the reference code that are aligned with the received codes, as illustrated in FIG. 4C. The aligned reference codes and received codes will match almost entirely, except for a few bits at the ends of the codes, and thus, will produce a strong correlation. Accordingly, a long code with a long period can be generated using only a single, short reference code.

Two-Dimensional Dither Representation

Figure 5:
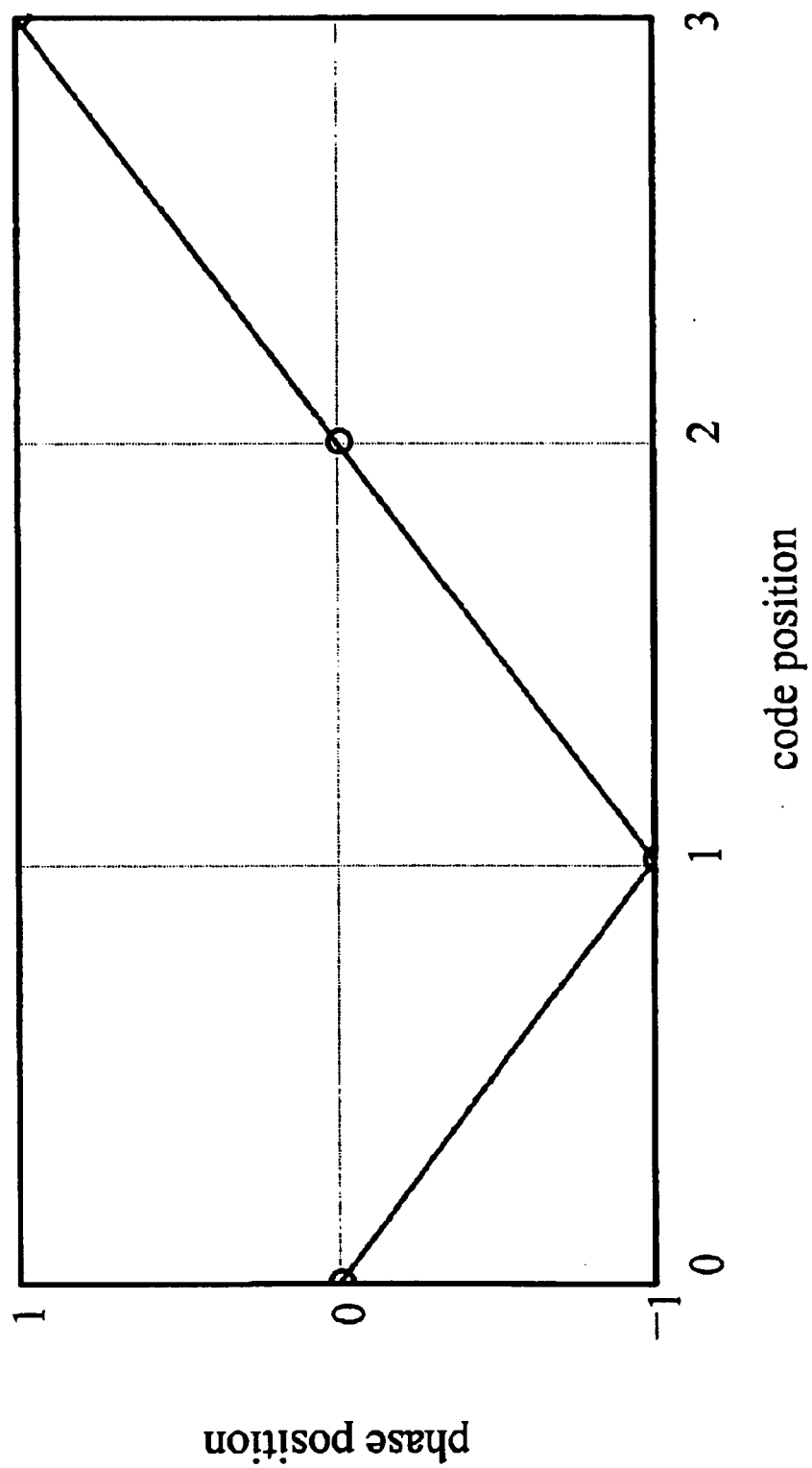
FIG. 5 is a dither pattern graph showing a dither code's code and phase positions.

A dither code can be portrayed as a two-dimensional pattern, as illustrated in FIG. 5. In FIG. 5 the horizontal "x" coordinate designates each of the short codes corresponding to the repetitions of the dithered reference code. The vertical "y" coordinate designates the phase shift of each code from its undithered position. The phase changes (also called phase jumps) correspond to the code length variations of the boundary dither; and the phase positions correspond to the code shift variations of the rotation dither, and also correspond to the alignment positions of the receiver's reference code.

FIG. 5 shows a two-dimensional dither pattern representing the dither codes shown in FIGS. 4A–C. The code length variations of the boundary dither code, shown in FIG. 4A, correspond to phase changes shown in FIG. 5. For example, the difference in code length between the reference code and the first short code shown in FIG. 4A is −1 because the first short code is one bit shorter than the reference code shown in FIG. 4C. This corresponds to a phase change of "−1" going from phase position "0" for the reference code to phase position "−1" for the first short code. FIG. 4A shows this phase change over the first short code of the boundary dither code. The phase change can be considered a phase vector going from (0, 0) to (−1, 0). The second short code of the boundary dither code shown in FIG. 4A has a phase change of +1 because the phase vector goes from (1, −1) to (2, 0). Likewise, the phase vector of the third short code is +1, as is the phase vector for the fourth short code shown in FIG. 4A.

The code shift variations of the rotation dither code, shown in FIG. 4B, correspond to the phase changes shown in FIG. 5. For example, the first short code of the rotation dither code shown in FIG. 4B has a phase change of "0" because the short code is identical to the reference code. The second short code of the rotation dither code is circularly shifted one position to the left, and hence, has a phase change of "−1" as shown in FIG. 4B, and is represented by the point at (1, −1). This is shown in FIG. 5 by the phase position changing from (0,0) to (1, −1). The third short code of FIG. 4B has the same phase as the reference code, and hence, a phase change of "0," and is shown in FIG. 5 as the point (2, 0). The fourth short code of FIG. 4B is circularly shifted one position to the right, and hence, has a phase change of "+1," and is shown in FIG. 5 as the point (3, 1).

The alignment positions of the receiver's reference code correspond to the phase positions in FIG. 5.

Thus, a dithered long code can be represented by a two-dimensional dither pattern graph such as the graph shown in FIG. 5.

Stationary Dither Code Generator/Transmitter

Figure 6:
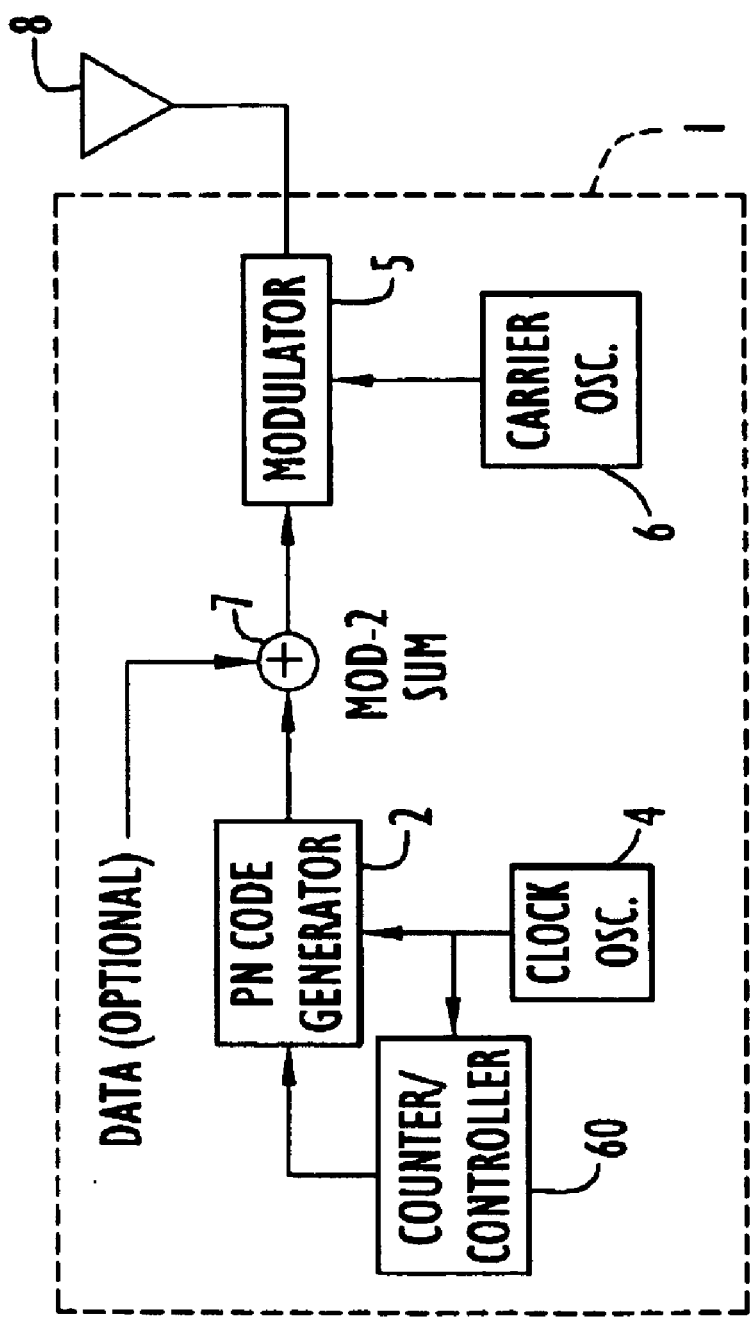
FIG. 6 is a block diagram of a transmitter according to one embodiment of the invention.

A stationary dither code generator and transmitter, according to one embodiment of the invention is shown in FIG. 6. The transmitter 1 includes like components of the conventional transmitter shown in FIG. 2, except that in place of timing counters 3 the transmitter includes a counter/controller unit 60. The counter/controller 60 controls the PN code generator 2 to either vary the length of the generated PN code or to alter the phase of the generated PN code by starting the sequence at various phases of the code. The result is that a stationary dither code, such as either a boundary or rotation dithered code, is output from PN code generator 2 that is ultimately transmitted.

Figure 7:
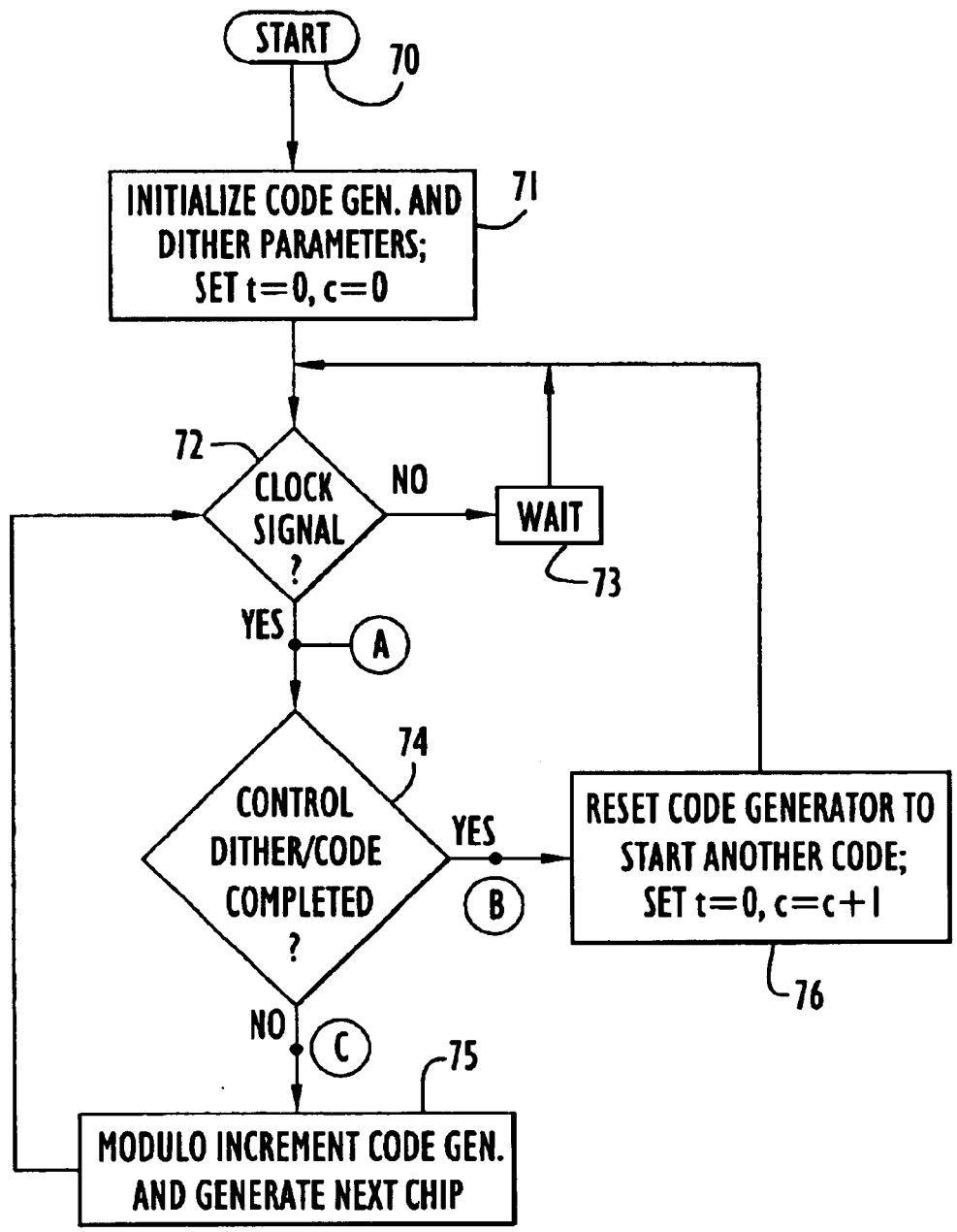
FIG. 7 is a flowchart showing operations for generating a stationary dither code according to the invention.

A method of generating a stationary dithered code is shown in FIG. 7. The method starts at operation 70, and in operation 71 the PN code generator 2 is initialized and dither parameters, such as the type and amount of dither, and dither pattern, are initialized. Also, variables t and c are set to zero, where t is the time position (in chips) within a code, and c is a number identifying a short code. In operation 72 if a clock signal occurs the process flows to operation 74, but if it does not occur the process waits in operation 73 for a clock signal. In operation 74 the counter/controller 60 controls the PN code generator 2 to generate a code symbol according to the type of dither selected in operation 71. Operation 74 is shown in greater detail in FIG. 8. If, according to the type of dither and dither pattern in use, the next symbol or chip of the current code is to be generated, the process flows to operation 75 where the PN code generator 2 is modulo incremented to generate a next chip "p". After operation 75 the process flows to operation 72 to await the next clock signal. If, however, in operation 74 it is determined that the current code is completed, the process flows to operation 76 where the PN code generator 2 is reset to begin the next code. After operation 76 the process flows to operation 72 to await the next clock signal.

Figure 8:
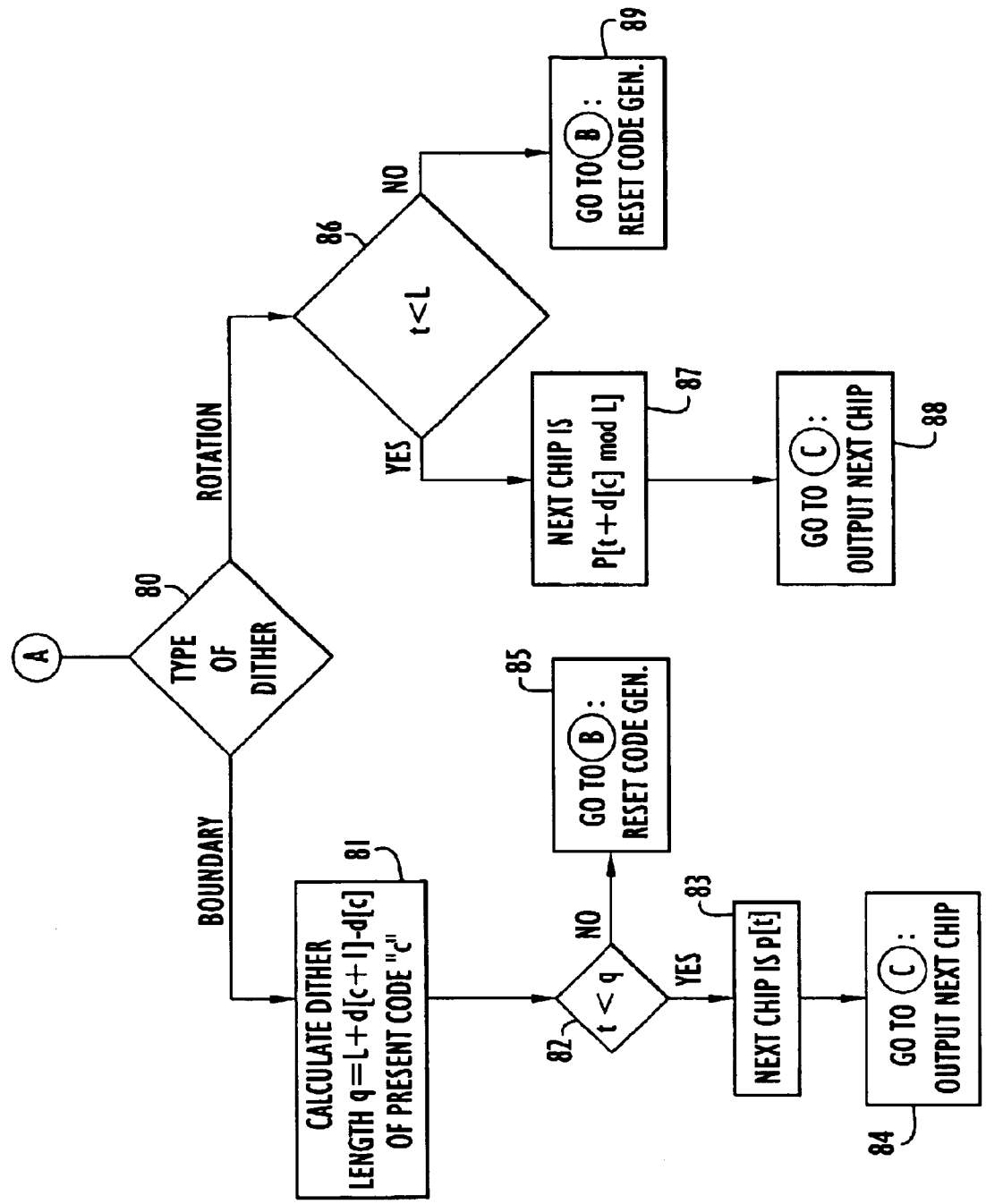
FIG. 8 is a flowchart showing operations for generating a boundary and rotation stationary dither codes according to the invention.

Operation 74 is shown in more detail in FIG. 8, and begins at the point denoted "A" in which the process flows from operation 72 to operation 80. Here, the nominal length of a short code is denoted "L", the current length of the boundary-dithered code is "q", the mth chip of the reference code is p[m], and the dither phase for short code c is denoted d[c]. In operation 80 the type of dither is detected based on the initialized dither parameters.

If the system uses boundary dither the process flows to operation 81 where the dither length "q" is calculated for the present short code "c". The length q of code c is calculated based on the boundary dither pattern in use. The nominal length L is varied by the difference in the dither phase d[c] for code c and the dither phase d[c+1] for the next code, thus, q=L+d[c+1]−d[c]. The process then flows to operation 82, which determines if the chip time t is still within the current code interval. If so, the next chip will be p[t], that is, chip t of the reference code, as indicated in operation 83, and the process flows in operation 84 back to the point designated "C" shown in FIG. 7. However, if t is not less than q, then the process flows to operation 85, where flow returns back to the point designated "B" shown in FIG. 7.

If rotation dither is in use, then the process flows to operation 86, which determines if chip time t corresponds to the end of the code. This is similar to operation 82, but here the code length is constant (equals L). If the end of the code has not yet been reached, then the next chip is to be output. As indicated in operation 87, the next chip will be p[t+d[c] modulo L]; that is, the chip position is shifted by the amount of the dither phase d[c]. Since the shift is a rotation, and bits can "wrap around", the modulo operation is needed. The process then flows to operation 88 which returns to the point designated "C" in FIG. 7 to output the next chip. If however, the end of the rotated code is reached, then the process flows to operation 89 which returns the flow to the point designated "B" shown in FIG. 7.

An Optimal Stationary Code

The autocorrelation of a long code will be optimum if the vector difference between any two points in the two-dimensional pattern for a dithered code is never repeated. This assures that no shifted alignment of two copies of the long code will match for any more than one short code.

Figures 9A, 9B:
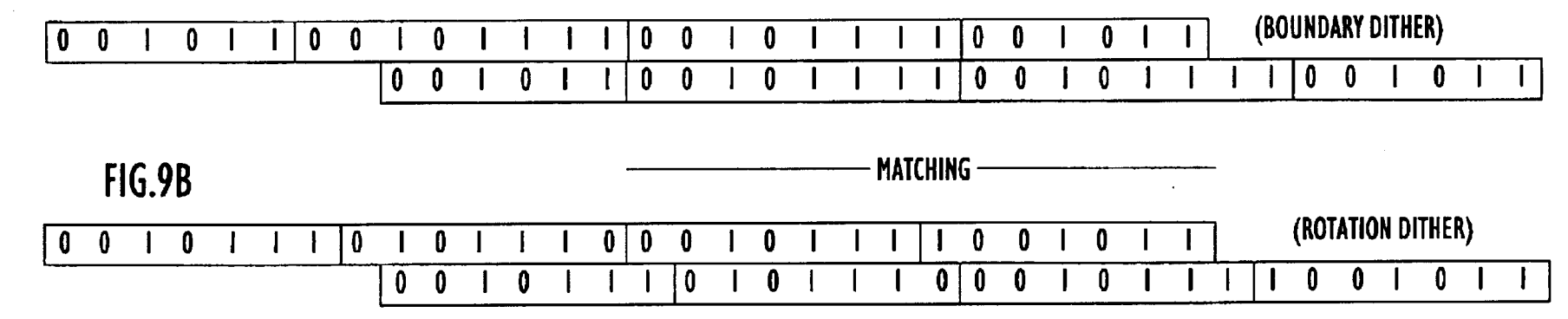

This property is not satisfied by the small example code shown in FIGS. 4A–C and by the dither pattern shown in FIG. 5, because the vector difference between code positions 1 and 2 (+1) is the same as between code positions 2 and 3 (+1). As a result, there is an alignment for which two short codes match, except for a few bits at the ends of the codes, as shown in FIGS. 9A and 9B. For the boundary dither code example, the second and third short codes match, except for a few bits at the end of the code, the third and fourth short codes of that code as shown in FIG. 9A. Similarly, the second and third short codes of the rotation dither code match, except for a few bits at the end of the code, the third and fourth short codes of that code as shown in FIG. 9B. Accordingly, the boundary dither and rotation dither codes shown in FIGS. 4A and 4B are non-optimal stationary dither codes.

Optimal Stationary Code Generation Method

An optimal stationary code has an optimum autocorrelation, and is produced by ensuring that the vector difference between any two points in the two-dimensional pattern for a dithered code is never repeated while creating the code one phase jump at a time. Applying this method determines the phase jumps that are not allowed. In generating an optimal stationary code, the phase jumps are chosen from the allowable phase jumps either by preference rules and/or by random choices.

A method for producing an optimal stationary code according to the invention is illustrated here in which the smallest allowable phase jump is given preference. However, the invention is not limited to giving preference to the smallest allowable phase jumps, and other phase jumps and preferences can be used.

In describing various methods for generating an optimal stationary code, the following terminology is used in connection with dither pattern diagrams, such as the. diagram shown in FIG. 5. "Point x, y" refers to code position x and phase position y, where position x is on the horizontal axis and the position y is on the vertical axis of the dither pattern graph such as that shown in FIG. 5. "Adding a vector to a point" refers to placing a copy of the vector so that the left end of the vector is on the point. The right end of the vector then reaches a new point. "Placing a short code" or "locating a short code" refers to selecting a code position x and phase position y to generate a short code at the selected code position and with the selected phase position.

The following notations are used in the dither pattern diagrams shown in the figures.

a small circle: a selected code point, represents the chosen phase of one of the short codes.

small X: a disallowed point where a code point may not be placed.

a solid line: a vector connecting two selected code points.

broken line: a vector connecting a selected code point and a disallowed point.

Figure 10A:
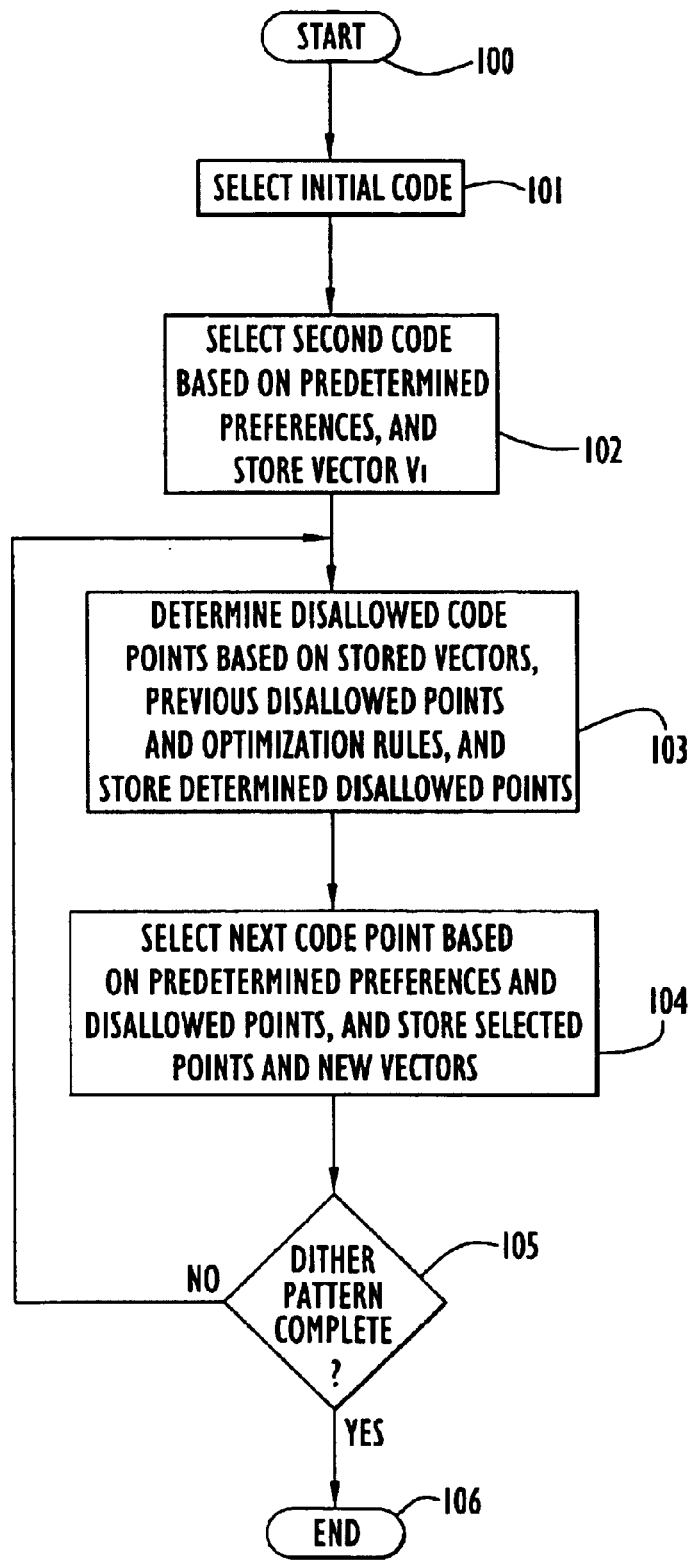
FIG. 10A is a flowchart showing operations for generating an optimal stationary dither code according to the invention.
Figure 10B:
FIG. 10B shows a table for storing selected points, vectors and disallowed points generated during the process illustrated in FIG. 10A.

A method for generating or designing an optimal stationary code according to the invention is shown in FIG. 10A. The method for selecting the points for the dither code is performed by a dither pattern generator, which preferably is a computer program running on a computer. However, the method for generating or designing an optimal dither code pattern also can be implemented in hardware or firmware, or by pencil and paper, as would be understood. FIG. 10B shows a table 107 constructed during the operation of the method illustrated in the flowchart of FIG. 10A. FIGS. 11A through 11C are dither pattern diagrams illustrating various stages in the construction of the optimal dither code constructed according to the method shown in FIG. 10A.

The method starts at operation 100, and in operation 101 the dither pattern generator places one short code (i.e., code 0) at phase position 0. At this time there no disallowed points. Alternatively, the initial short code can be placed at any point, and the point (0, 0) is chosen here for convenience. The selected point, in this example, is recorded in a table 107. The generator places the next short code (i.e., code 1), in operation 102, at a location based on predetermined preferences. Here, the preference is to locate subsequent short codes at points using the smallest phase jump possible. The generator checks table 107 for any disallowed points, but since there are none at this time and the preference is to use the smallest phase jump, the next short code (i.e., code 1) is placed at (1, 0), i.e., code 1 is selected to have a zero phase difference from the reference code. The generator records that code and phase as a selected point in table 107. That selected point is shown in FIG. 11A as a small circle at (1, 0). Selecting point (1, 0) also determines a first vector $V_1$ shown as the solid line in FIG. 11A, which too is recorded in table 107.

In operation 103 the generator determines the disallowed points based on the first vector $V_1$, previously disallowed points, and on the points that have already been selected, and records the newly disallowed points in table 107. In order to generate an optimal dither code, which will result in a long code that has an optimal autocorrelation, the sequence of short codes must be selected so that a vector formed between any two points in the long code is not repeated anywhere else in the code. Accordingly, in operation 103 the generator must disallow points that would form a vector corresponding to a vector that already has been formed in the long code. In this instance, there is only one vector that has been formed, namely vector $V_1$. The generator adds that vector to all selected code positions in the long code to locate the points to be disallowed. Here, the generator adds $V_1$ to point (0, 0), resulting in point (1, 0), however that point is already selected so the generator ignores it. The generator also adds vector $V_1$ to the other point in the code, point (1, 0), resulting in point (2, 0). The generator checks table 107 and determines that point (2, 0) has not been selected or previously disallowed, and accordingly disallows it by recording it in table 107 as a disallowed point. This appears on the dither pattern graph as an "X" at point (2, 0), and the vector from the selected point is shown as a broken line.

The process flows next to operation 104 where the next code (i.e., code 2) is selected. In this example the preference is to select a code that results in the smallest phase jump. The generator checks table 107 and finds that point (2, 0) is a disallowed point, and accordingly, code 2 can be placed at phase +1 or −1. A deterministic rule, such as selecting a positive phase jump, can be specified in the preferences and used to select the code. Alternatively, the next code can be randomly selected among the equally preferred choices. Here, +1 phase is chosen and point (2, 1) is recorded in table 107. Selecting code 2 defines two new vectors, $V_2$ and $V_3$, shown as solid lines in FIG. 11B, and the generator records those vectors in table 107.

The generator next determines, in step 105, if the dither pattern is complete. If so, the process ends at operation 106, and if not the process returns to operation 103.

Next, in operation 103, the generator determines disallowed points based on the newly selected points and the corresponding vectors. It does this by adding the newly determined vectors to all the selected code points, as shown by the broken lines in FIG. 11B. If those vectors reach either a selected point or a disallowed point, they are disregarded. The points where those vectors reach that have not been disregarded are points to be disallowed and are shown in FIG. 11B with an "X" and the vectors are shown with broken lines. The points those vectors reach are stored in table 107 as the newly determined disallowed code points.

Operation 104 is again performed using the information recorded in table 107, and here the generator selects code 3 to have a phase of 0. Hence, the generator selects code (3,0) and records that selected code in table 107. The vector to this newly selected point is shown with a solid line in FIG. 11C and is designated $V_4$, and is recorded in table 107. The process continues to operation 105, and since the dither pattern is not complete flow returns to operation 103.

Operation 103 is once again performed using the information recorded in table 107. Using the newly selected code point (3, 0), vector $V_4$ is added to each selected code point. Here, new vectors are generated and are shown with broken lines. The end points of these new vectors determine additional disallowed points that are recorded in table 107, and are shown in FIG. 11C. In operation 104 the generator determines that code 4 is allowed at phase positions −2 and +3. Since −2 is the smallest allowable phase jump, the generator selects code point (4, −2) and records it in table 107. The process will continue until in operation 105 the dither pattern is determined to be complete.

Optimum stationary dither codes can be generated either deterministically or randomly. For example, the generator can choose the next code point from among the two or more nearest allowable points based on a predetermined rule. Alternatively, the generator can randomly choose the next code point from among those nearest allowable points. Also, it will be understood that other techniques for keeping track of selected code points, vectors, and disallowed points can be used, and the use of table 107 is but one such technique.

Figure 12A:
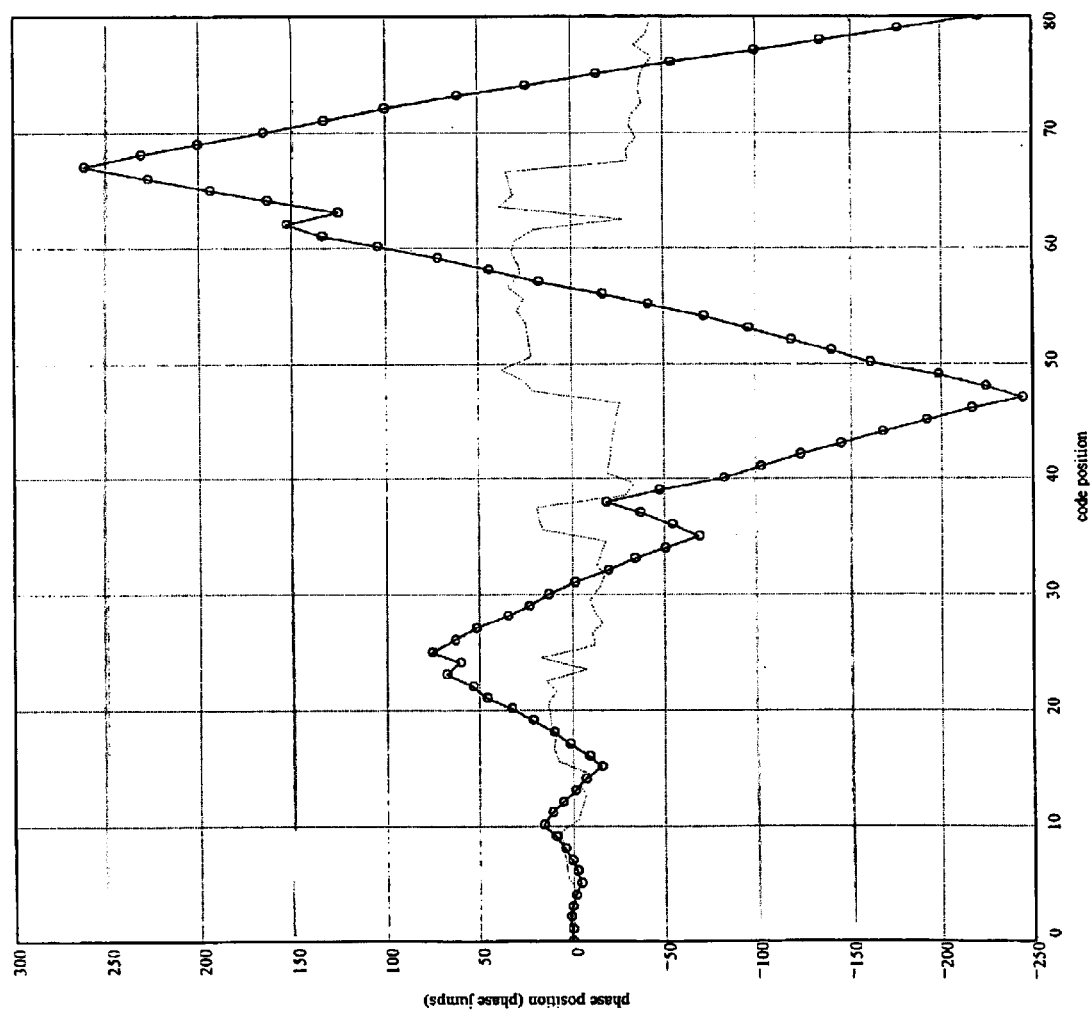
FIG. 12A is a dither pattern graph of an example optimum long dither code generated from 81 short pseudonoise codes.

An example of an optimal stationary code generated using a computer program based on the inventive method, and the corresponding dither code pattern is represented in the graph shown in FIG. 12A. The graph in FIG. 12A represents an optimal long dither code composed of 81 short PN codes that was generated according to the invention. In FIG. 12A the solid line plots the sequence of phase positions of the optimal dither code. The dotted line plots the size of the phase jumps. In this example, in which the code generation was stopped after 80 code repetitions, the most extreme phase positions are −244 and 262.

FIG. 12B shows ten examples of optimal dither codes, each composed of 50 short PN codes, generated according to the invention. Those dither codes were generated by modifying the method to add random choices and selecting the choice that tends to return the dither pattern to a zero phase position.

Those optimal dither codes, as well as any dither code generated according to the invention, can be truncated to any desired length. The methods used to generate the codes shown in FIGS. 12A and B can be modified to include random choices, or different preferences, as desired.

Having described preferred embodiments of the invention relating to generating stationary codes including optimal stationary codes, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in their ordinary and accustomed manner only, unless expressly defined differently herein, and not for purposes of limitation.

What is claimed is:

1. A method of generating a dither code, comprising:
   a) generating a first short code by dithering a reference code according to a dither pattern;
   b) generating a second short code by dithering the reference code according to the dither pattern, wherein the code phases of the first and second short codes are different from each other;
   c) repeating a) and b) a predetermined number of times; and
   d) outputting in sequence the short codes generated in a) through c) as the dither code, wherein the dither pattern repeats after a) and b) are repeated the predetermined number of times.

2. The method according to claim 1, wherein the dither pattern changes the length of the reference code according to a predetermined pattern.

3. The method according to claim 1, wherein the dither pattern changes the phase of the reference code according to a predetermined pattern.

4. The method according to claim 1, wherein using the dither pattern in a) through c) results in the dither code having an optimal autocorrelation characteristic.

5. The method according to claim 1, wherein the reference code is a pseudonoise code.

6. The method according to claim 5, wherein the dither code is a stationary dither code.

7. The method according to claim 6, wherein the dither pattern is a predetermined fixed pattern.

8. A method of generating a composite code from M instances of a reference code that has a reference phase, where M is an integer, the method comprising:
   a) selecting an (N−1)th code generated from the reference code, the (N−1)th code having an (N−1)th phase position, where N is an integer less than M;
   b) selecting an Nth code generated from the reference code, the Nth code having an Nth phase position that is different from the (N−1)th phase, and determining a vector V between the (N−1)th code and phase and the Nth code and phase;
   c) adding the vector V to the (N−1)th code and codes generated prior to the (N−1)th code to determine disallowed code points; and
   d) selecting a (N+1)th phase for a (N+1)th code from among code points other than the disallowed code points.

9. The method of claim 8, further comprising repeating a) through d) and incrementing N until N+1=M.

10. An apparatus for generating a composite code, comprising:
   a clock oscillator outputting a clock signal;
   a controller coupled to the clock oscillator, counting in response to the clock signal, and generating a control signal based on the count and indicating a dither amount; and
   a code generator coupled to the controller and generating a code dithered in response to the control signal, wherein the controller generates the control signal to indicate an amount of dither for the generated code so the phase of the generated code is different from the preceding code generated by the code generator, and wherein dither is repeated a predetermined number of times.

11. The apparatus of claim 10, wherein the dither amount indicates a length of the code to be generated.

12. The apparatus of claim 10, wherein the dither amount indicates a phase rotation amount of the code to be generated.

13. The apparatus of claim 10, further comprising an transmission unit for transmitting the dithered code generated by the code generator.

14. The apparatus of claim 10, wherein the controller generates the control signal to control the code generator to produce the composite code to have an optimal autocorrelation characteristic.

15. The apparatus of claim 10, wherein the reference code is a pseudonoise code.

16. The apparatus of claim 10, wherein the controller determines the amount of dither indicated in the control signal from a dither pattern.

17. The apparatus of claim 16, wherein the dither pattern is fixed in length and repeats.

* * * * *